US012258210B2

(12) United States Patent
Panga et al.

(10) Patent No.: US 12,258,210 B2
(45) Date of Patent: Mar. 25, 2025

(54) OBJECT TRANSPORTING APPARATUS (71) Applicant: Google LLC, Mountain View, CA (US)

(72) Inventors: Avinash Panga, Woodinville, WA (US); Adam Morton, Kirkland, WA (US)

(73) Assignee: Google LLC, Mountain View, CA (US)

(*) Notice: Subject to any disclaimer, the term of this patent is extended or adjusted under 35 U.S.C. 154(b) by 241 days.

(21) Appl. No.: 17/694,160

(22) Filed: Mar. 14, 2022

(65) Prior Publication Data
US 2023/0286747 A1 Sep. 14, 2023

(51) Int. Cl.
B65G 1/10 (2006.01)
B65G 1/137 (2006.01)

(52) U.S. Cl.
CPC ............... B65G 1/10 (2013.01); B65G 1/137 (2013.01); B65G 2203/0283 (2013.01); B65G 2203/041 (2013.01)

(58) Field of Classification Search
CPC ....................................................... B66F 9/122
See application file for complete search history.

(56) References Cited

U.S. PATENT DOCUMENTS

| | | | | |
|---|---|---|---|---|
| 3,167,201 A | * | 1/1965 | Quayle | B66F 9/122 414/664 |
| 4,801,238 A | * | 1/1989 | Pezzolato | B66F 9/205 280/43.12 |
| 5,577,873 A | * | 11/1996 | Tanaka | B66F 9/18 414/400 |
| 8,965,561 B2 | | 2/2015 | Jacobus et al. | |
| 9,561,941 B1 | | 2/2017 | Watts | |
| 10,398,055 B1 | * | 8/2019 | Tandon | G06Q 30/016 |
| 11,511,981 B2 | | 11/2022 | Marshall et al. | |
| 2019/0352158 A1 | * | 11/2019 | Tani | B66F 9/063 |
| 2021/0141368 A1 | | 5/2021 | Holwell et al. | |
| 2021/0271246 A1 | * | 9/2021 | Takao | G01S 17/87 |

FOREIGN PATENT DOCUMENTS

| | | |
|---|---|---|
| EP | 3677487 | 7/2020 |
| EP | 3882574 | 9/2021 |
| GB | 2572296 | 9/2019 |
| JP | H06-32227 | 2/1994 |
| JP | 2019-014575 | 1/2019 |
| WO | WO 2019010509 | 1/2019 |
| WO | WO 2021087312 | 5/2021 |

OTHER PUBLICATIONS

Extended European Search Report in European Appln. No. 22193395.5, dated May 16, 2023, 8 pages.

* cited by examiner

Primary Examiner — Jonathan Snelting
(74) Attorney, Agent, or Firm — Fish & Richardson P.C.

(57) ABSTRACT

An apparatus for handling objects such as information technology equipment racks in an environment such as a data center. In one aspect, the apparatus includes a body having a first mount on a first interior side of the body; and second mount on a second interior side of the body and in same horizontal position as the first mount; and a lifting system comprising one or more lifting elements with one or more retractable wheels coupled each of the one or more lifting elements, wherein, when the lifting system extends outside of the body to handle an object, the object rests on the one or more retractable wheels that are in an extended position, and when the lifting system is substantially inside the body, the retractable wheels are in a retracted position, and the object rests on the first mount and the second mount of the body.

23 Claims, 7 Drawing Sheets

OBJECT TRANSPORTING APPARATUS

BACKGROUND

This specification relates to an apparatus for transporting objects.

A warehouse may be used for storage of objects by a variety of different types of entities, including manufacturers, wholesalers, and transport businesses. These warehouses typically have many storage rows separated by aisles. Likewise, a datacenter may have racks of servers in rows, and separated by aisles. For example, in data centers or server rooms, various pieces of electronic equipment such as hard disk drives (HDDs) or servers are often mounted in racks, sometimes referred to as rack consoles. Each rack includes means for mounting electronic components therein. Mounting means may include devices such as drawers, slots, brackets, shelves, or combinations thereof. As used in this specification, the term "equipment facility" means both a facility in which objects are stored but not in use (such as a warehouse) and a facility in which objects are stored that are in use (such as a datacenter).

In some cases, workers in the equipment facility may use machines or vehicles for lifting and moving objects or pallets of objects. Such equipment includes cranes, pallet jacks, and forklifts. Some of these facilities, however, have very narrow aisles between rows, and thus of forklifts, even side-load forklifts, can be quite time consuming. Moreover, some of these facilities have an aisle spacing built to accommodate the width of existing side-load forklifts. Finally, human operators may be employed to operate machines, vehicles, and other equipment. However, manual forklift operation can cause delays and backlogs in the process of responding to inventory or maintenance requests, and furthermore require drivers and loaders and their salaries and benefits burden, such as safety and ergonomics in the removal and storage of objects and particularly those that are bulky or heavy or both.

SUMMARY

The specification describes a robotic apparatus for handling objects while deployed in relatively narrow aisle of an equipment facility. For example, the robotic apparatus can pick up, transport, and place IT equipment racks, cooling equipment, power unit, or other populated racks within an environment such as a data center or a server room in an automated manner.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages.

This specification describes a robotic apparatus that can transport objects to and from arbitrary locations within a space restricted facility such as a data center or a server room where space constraints, orientation of the payload movement, insertion directions, and the like may pose challenges to effective operation of many conventional object handling apparatuses including standard pallet jacks and side loader forklifts. Compared with these conventional apparatuses, the described robotic apparatus can also handle a greater variety of objects, e.g., objects with different mass distribution than those typically handled by a pallet jack (such as palletized shipments that usually are heavier on the bottom). Further, the described robotic apparatus would improve object handling efficiency and reduce upfront cost associated with manual picking labor while requiring no significant changes to the infrastructure of an existing facility, such as existing shelving or racks and existing layouts.

Specifically, the described robotic apparatus can operate in environments with limited operational areas. In some examples, the robotic apparatus can remove or insert objects stored along narrow aisles that may be as narrow as 42". The described robotic apparatus has lifting capacity that is sufficient for common objects that may be present in a data center or server room. In some examples, the robotic apparatus can transport a payload with a maximum weight of 4500 lbs, or more.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The specification describes a robotic apparatus for handling objects while deployed in relatively narrow aisle of an equipment facility. For example, the robotic apparatus can pick up, transport, and place IT equipment racks, cooling equipment, power unit, or other populated racks within an environment such as a data center or a server room in an automated manner. In some of these examples, the robotic apparatus may be fully automated and operated by a control system located on the robotic apparatus. In others of these examples, different levels of assistance (e.g., from a human operator or a remote control system) may be used to control or assist operation of the robotic apparatus, ranging from direct remote control (referred to as "teleoperation") to select supervision of certain tasks or functions.

The robotic apparatus includes a main body that has an open front, and two side surfaces opposite to one another that each has a mount on a respective interior side of the side surfaces. The robotic device is made mobile by coupling the main body to a drive system including a wheeled base, e.g., a holonomic base (e.g., a base that can move in any direction), that propels and positions the apparatus along the ground surface.

The robotic apparatus includes a lifting system including one or more lifting elements, e.g., one or more forks, for lifting and/or moving the objects. In some examples, the lifting elements may be elevated to lift the objects, e.g., off the ground. Each of the one or more lifting elements has one or more retractable wheels coupled to it. In some examples, the retractable wheels coupled to the lifting elements may be hydraulic lifting wheels that operate in one degree of freedom.

More specifically, the lifting system includes one or more drive actuators that can drive the one or more lifting elements to extend outside of the body to place the lifting elements under the object, and one or more wheel actuators that can drive the one or more retractable wheels to an extended position to lift the object with the lifting elements. In other words, when the lifting system extends outside of the body to perform an object handling task, the retractable wheels are in the extended position and directly contact the horizontal surface, and the picked object rests on the one or more retractable wheels and is positioned to not rest on the first mount and second mount.

After lifting the object, the one or more drive actuators can then drive the one or more lifting elements to retract into the body while resting on the one or more retractable wheels, and the wheel actuators retract the wheels to the retracted position so that the first mount and second mount (i.e., instead of the retractable wheels) directly support the object and, in some cases, the lifting system. In other words, the object and, in some cases, the lifting system itself, too, rest on the first mount and the second mount of the body when the lifting system is substantially inside the body and the retractable wheels are in the retracted position.

In some implementations, the power sources that drive the wheel and drive actuators are located such that the depth of the apparatus is defined by a length of lifting elements, e.g., the length of the forks, and a back wall that is opposite the open front area. For example, power sources for the drive and wheel actuators may be located within the sides of the apparatus, thereby narrowing the overall depth of the apparatus. Accordingly, the apparatus can be used in aisles that are not wide enough to accommodate conventional side load forklifts.

These features and additional features will be described in more detail below. It is worthwhile noting that although the robotic apparatus described in this document is largely described in the context of transporting information technology (IT) equipment racks, cooling equipment, power unit, or other populated racks in a data center or a server room, the robotic apparatus as well as associated techniques can be similarly applied to any of a variety of other use cases. For example, the robotic apparatus can be used to facilitate automated handling of any moveable article such as container or palletized material in logistic facilities such as warehouses, superstores, and other manufacturing facilities.

Figure 1A:
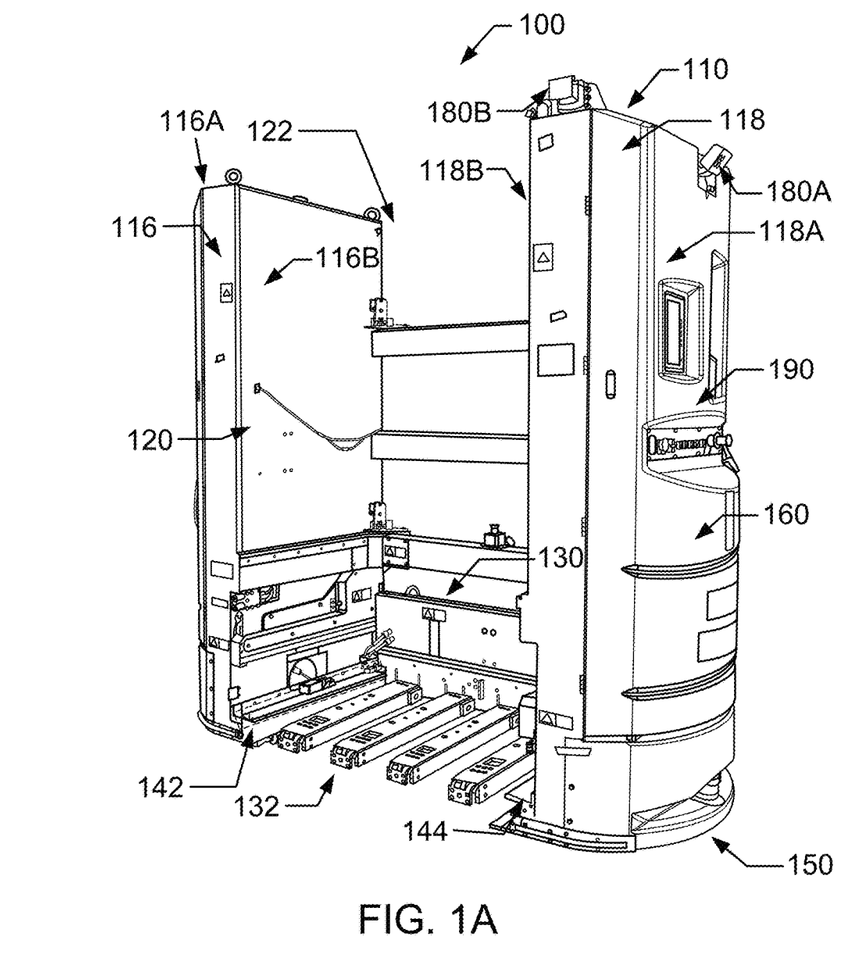
FIGS. 1A-B are respective perspective views of an example embodiment of a robotic apparatus for handling objects.
Figure 1B:
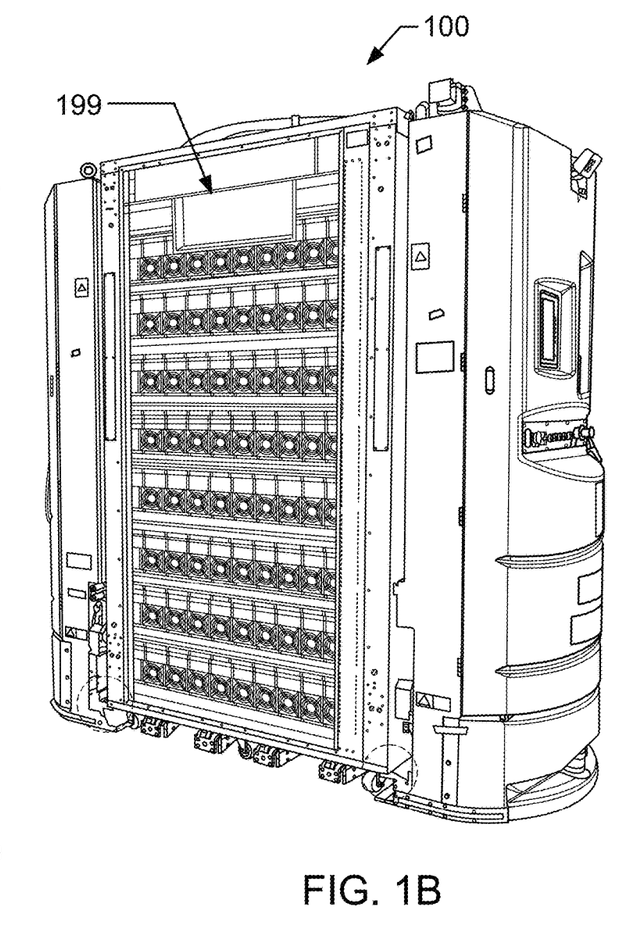

FIGS. 1A-B are respectively perspective views of an example implementation of a robotic apparatus 100 for handling information technology equipment racks. As shown in FIG. 1, in some implementations, the robotic apparatus 100 can have a main body 110 that defines a first side surface 116, and a second side surface 118 opposite to the first side surface 116, and an open front area 120 on a front side of the main body 110. In some such implementations, the first side surface 116, and the second side surface 118 can be substantially vertical with respect to the ground, and the robotic apparatus 100 can have a back surface that is opposite to the front side of the main body 110. Collectively, the first side surface 116, the second side surface 118, and the back surface define an interior space 122 open to the front 120 of the main body 110.

In particular, the first side surface 116 defines a first exterior side 116A that is opposite to a first interior side 116B that faces the interior space 122. Likewise, the second side surface 118 defines a second exterior side 118A that is opposite to a second interior side 118B that similarly faces the interior space 122. Both the first interior side 116B and second interior side 118B can be substantially vertical with respect to the ground, and each interior side can have a respective mount coupled to it and configured to support an information technology equipment rack once the rack has been received into the interior space 122 of the robotic apparatus 100. That is, the first side surface 116 has a first mount 142, and the second side surface 118 has a second mount 144 in same horizontal position as the first mount. Each mount 142 or 144 can have an upper or contact surface used for supporting the information technology equipment rack. In some implementations, each mount can be provided in the form of a panel (or plate or tile) that is horizontally oriented, and the mount can be coupled to the interior side of the side surface along a longitudinal side of the panel.

The robotic apparatus 100 is made mobile by coupling the main body 110 to a drive system 150 including a wheeled base. The wheeled base has a set of multiple drive wheels, each of which may be driven by a servo motor to propel and position the apparatus along the ground.

The robotic apparatus 100 can use a lifting system 130 that includes one or more lifting elements to pick up an IT equipment rack. The one or more lifting elements, which are actuatable components of the apparatus, can be driven by one or more actuators of the lifting system 130 to extend outside of (or retract into) the main body 110, and to raise (or lower) in order to lift (or place) the IT equipment rack. In some examples, as depicted in FIG. 1A, the lifting system 130 can include multiple lifting elements, e.g., lifting element 132, arranged in the form of forks (also referred to as "tines" or "prongs"). In other examples, the lifting system 130 can contain only a single lifting element (e.g., a single surface) that can be raised or lowered. In some examples, common IT equipment racks may have a certain standardized shape and/or size, such as a cabinet with fixed legs or caster wheels on the bottom. In such examples, the lifting system 130 can have one or more lifting elements that are arranged to adapt to the standardized shape of the IT equipment rack, e.g., to reciprocally fit between the bottom caster wheels of the rack.

To perform the IT equipment rack pickup task, the lifting system 130 can first drive the one or more lifting elements to extend outside of the main body 110 to place the one or more lifting elements under the IT equipment rack, and then raise the lifting elements in order to complete pickup task. The lifting system 130 can then drive the one or more lifting elements on which the IT equipment rack rests to retract into the main body 110 of the robotic apparatus 100.

In particular, the one or more lifting elements each have one or more retractable wheels coupled underneath to them. The wheels coupled to the lifting elements may, and generally will, be different from the drive wheels of the wheeled base. For example, the drive wheels can be caster wheels that operate with two degrees of freedom, while the one or more retractable wheels coupled to each of the one or more lifting elements can be roller wheels that operate with only one degree of freedom, e.g., in a direction perpendicular to the direction along which the robot apparatus 100 travels.

Figure 2:
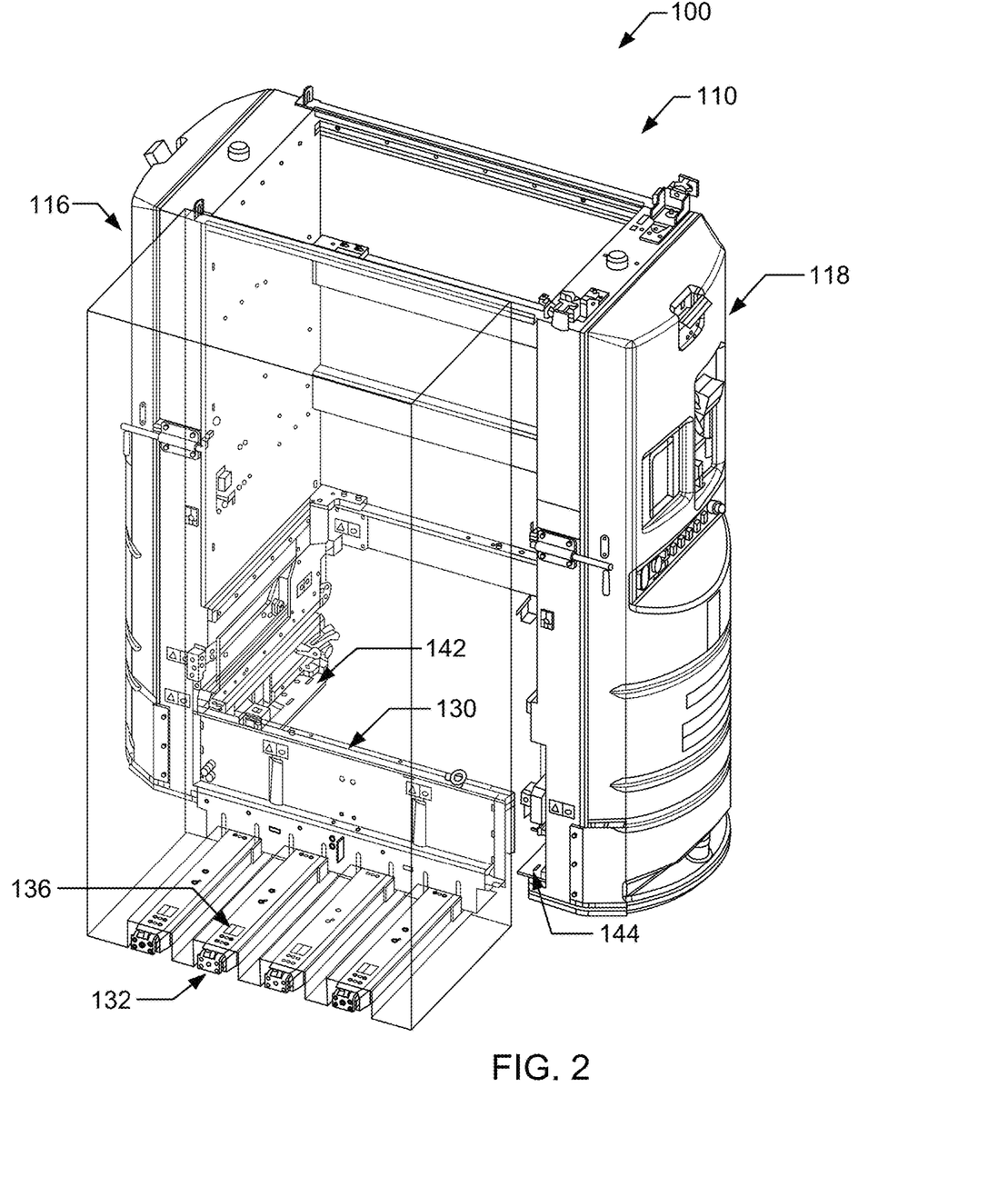
FIG. 2 is a perspective view of another example embodiment of a robotic apparatus.

FIG. 2 is a perspective view of another example embodiment of a robotic apparatus, e.g., the robotic apparatus 100 of FIG. 1. The robotic apparatus 100 has a main body 110 that defines a first side surface 116, and a second side surface 118 opposite to the first side surface 116, where the first side surface 116 has a first mount 142 coupled to it (on an interior side) and the second side surface 118 has a second mount 144 coupled to it (similarly, on an interior side) in same horizontal position as the first mount. In particular, as shown in FIG. 2, a retractable wheel 136 (configured as a retractable roller wheel) is coupled underneath to a lifting element 132 of the lifting system 130. In the example of FIG. 2, the lifting system 130 has extended outside of the main body 110.

The retractable wheels coupled to each of the one or more lifting elements are made "retractable" by hydraulics (or pneumatics). That is, the extension and contraction of the wheels coupled to bottom side of the lifting elements along a vertical direction can be hydraulic (or pneumatic). Although in most hydraulic and pneumatic systems, it may require no power for the wheels to enter the retracted position (e.g., from the extended position), but rather a simple release of hydraulic or pneumatic pressure. This use of hydraulic lifting wheels gives the lifting system 130 the capability to operate in a way that is similar to scissor lift mechanism, a type of vertical lift mechanism achieved by the application of pressure to the lowest set of supports of a top platform, elongating the supports, and propelling the top platform upward vertically. This configuration also provides the robotic apparatus with sufficient lifting power under the lifting elements, e.g., rather than on the side or back surfaces of the main body 110, rendering the overall dimensions of the robotic apparatus 100 more compact and therefore operable in space restricted facilities.

In the example of FIG. 1A, the use of the retractable wheels configured as hydraulic lifting wheels provides for a lifting mechanism similar to the scissor lifting mechanism arranged atop the one or more lifting elements such that, (i) when entering into an extended position, the hydraulic lifting wheels can raise the one or more lifting elements relative to the main body (or more specifically, the first and second mounts of the main body, for example by a fixed distance), and (ii) when entering into an retracted position, the hydraulic lifting wheels can lower the one or more lifting elements relative to the main body.

In this way, after the lifting system 130 extends outside of the main body 110 to place the one or more lifting elements under the IT equipment rack in order to pick up the IT equipment rack, the one or more retractable wheels coupled to each of the one or more lifting elements can extend into an extended position and directly contact the horizontal surface, and the IT equipment rack that has been picked up by the one or more lifting elements of the lifting system 130 rests on (i.e., is supported by) the one or more retractable wheels and is positioned to not rest on the first mount 142 and second mount 144 of the main body 110. In addition, when the lifting system 130 is substantially inside the main body 110, the retractable wheels can retract into a retracted position and do not directly contact the horizontal surface, the IT equipment rack that has been lifted by the one or more lifting elements of the lifting system 130 and, in some cases, the lifting system 130 itself, too, rest on (i.e., are supported by) the first mount 142 and the second mount 144 of the main body 110.

As shown in FIG. 1B, after the lifting system 130 picks up an IT equipment rack 199 with the one or more lifting elements and retracts back into the main body 110, the retractable wheels underneath the one or more lifting elements retract into the retracted position, thereby lowering the one or more lifting elements relative to the main body (or more specifically, the first and second mounts of the main body, for example by a fixed distance). Thus, instead of being supported by the one or more lifting elements of the lifting system 130, IT equipment rack 199 now rests on first mount 142 and the second mount 142 of the main body 110 (as shown in the dashed circles).

Figure 5A:
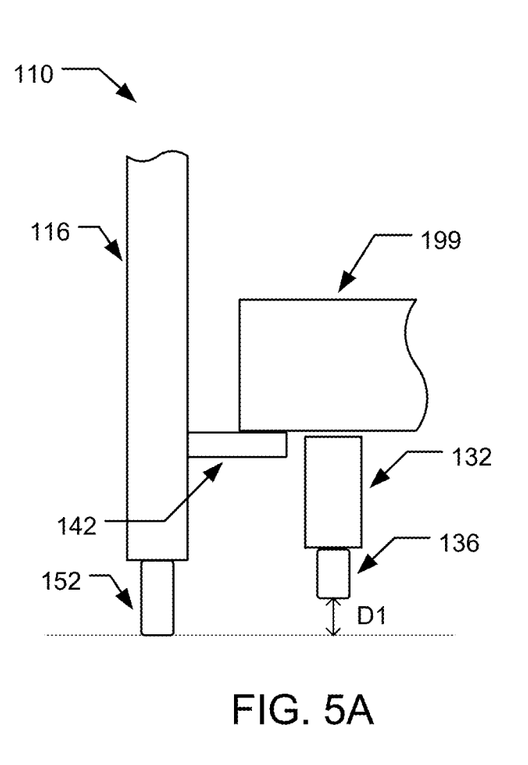
FIG. 5A is an example illustration that shows how an object rests on a mount of a robotic apparatus when retractable wheels are in a retracted position.

FIG. 5A is an example illustration that shows how an object rests on a mount of a robotic apparatus, e.g., the robotic apparatus 100 of FIG. 1, when retractable wheels are in a retracted position. The object 199 may be an IT equipment rack 199 that has been lifted by using the lifting element 132 of the robotic apparatus 100 and then put to rest on the first mount 142. In this position, the lifting element 132 may or may not be in contact with the rack 199. The retractable wheel 136 coupled underneath to the lifting element 132 is retracted and at a distance D1 above from the ground surface. With the retractable wheel 136 in the retracted position, the IT equipment rack 199 that has been picked up now rests on (i.e., is supported by) the first mount 142 of the main body 110 of the robotic apparatus 100.

Figure 5B:
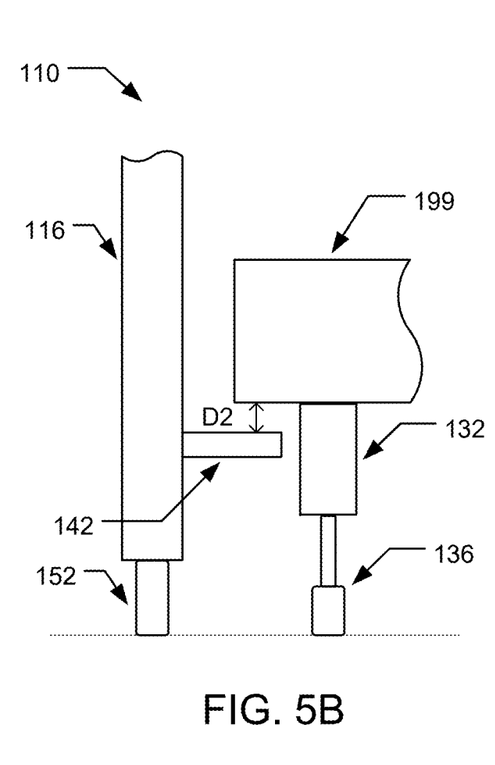
FIG. 5B is an example illustration that shows how an object rests on a lifting system of a robotic apparatus when retractable wheels are in an extended position.

FIG. 5B is an example illustration that shows how an object rests on a lifting system of a robotic apparatus, e.g., the robotic apparatus 100 of FIG. 1, when retractable wheels are in an extended position. The retractable wheel 136 has gone down (front view) so the lifting element 132 of the robotic apparatus 100 rises, lifting the IT equipment rack 199 up by a distance D2 (which may or may not be the same as D1) relative to the first mount 142 of the main body 110. The IT equipment rack 199 now rests on (i.e., is supported by) the retractable wheel 136 of the lifting system of the robotic apparatus 100. In either example configuration, the drive wheel 152 of the wheeled base is always on the ground surface.

The robotic apparatus 100 has multiple sensors. In particular, in some implementations, the robotic apparatus 100 can have a set of sensors that enable autonomous navigation within a data center and that allow it to identify and localize individual IT equipment racks to pick up. The set of sensors can be any 3D sensing devices capable of sensing the local environment that include, for example, 3D depth cameras, color cameras, laser ranging devices, radar devices, or a combination thereof.

In some of these implementations, the robotic apparatus 100 can have a first camera 180A mounted on the first side surface 116 of the main body 110 and configured to capture first image data characterizing an environment in front of the first side surface 116 (e.g., including any obstacle that may be present in the path of the robotic apparatus); and a second camera 180B mounted on the front 120 of the main body 110 and configured to capture second image data characterizing the IT equipment rack to pick up.

In some implementations, the robotic apparatus 100 can have another set of sensors that enable the robotic apparatus 100 to more rapidly locate and identify an IT equipment rack. The other set of sensors can include one or more barcode or radio frequency identification (RFID) scanners that provide signals related to detection, identification, and location of the IT equipment rack to pick up.

The robotic apparatus 100 has an onboard control system 160 which is configured to run a set of programs with algorithms capable of performing navigation and IT equipment rack handling tasks. In particular, the onboard control system 160 can include one or more computer processors and one or more memory storage devices storing computer program instructions executable by the one or more computer processors to process data received from each of the onboard sensors and output control signals to the components onboard the robotic apparatus 100, i.e., to the wheeled base and the lifting system 130, for apparatus navigation, IT equipment rack pickup or placement, respectively. The onboard control system 160 may also communicate with a remote control system (e.g., a remote automated system or a remote human-operated system) to receive electronic component swap information and respond back with confirmation data to inform the remote control system of successful IT equipment rack pickup-transport-placement or any errors that might occur. Additionally or alternatively, the onboard control system 160 may receive remote control signals from the remote control system and directly control the components onboard the robotic apparatus 100 in accordance with the remote control signals.

Figure 3:
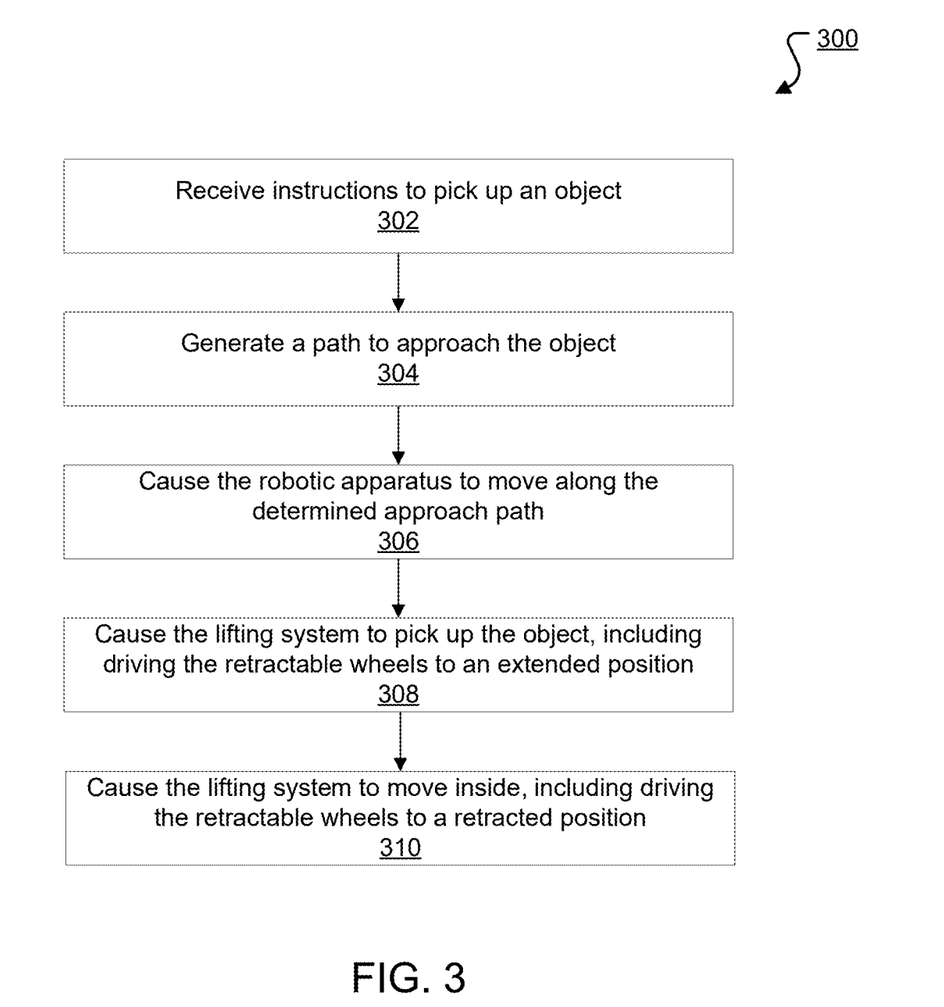
FIG. 3 shows a flow diagram of an example process for operating a robotic apparatus.

FIG. 3 shows a flow diagram of an example process 300 for operating a robotic apparatus, e.g., the robotic apparatus 100 of FIG. 1. For convenience, the process 300 will be described as being performed by a system of one or more computers located in one or more locations. For example, a control system, e.g., the control system 160 of the robotic apparatus 100 of FIG. 1, appropriately programmed in accordance with this specification, can perform the process 300.

The system receives instructions to perform an IT equipment rack pickup task (step 302). The instructions to perform the IT equipment rack pickup task may include any type of digital signal or information that is receivable by the system. In some examples, the instructions may include a signal to pick up a target IT equipment rack associated with additional information identifying the target IT equipment rack, e.g., a location of the rack, or other types of identifying information such as identification numbers). In some of these examples, the system may receive the instructions as input by a human operator that are entered through an input device of the robotic apparatus. In others of these examples, the instructions may instead be sent by the remote control system over a data communication network to the onboard system.

The system generates a path to approach the IT equipment rack (step 304). In particular, the system can determine an approach path for the robotic apparatus to move along in order to position itself with the open front directly facing the IT equipment rack. The approach path may start at a current positioning of the robotic apparatus. In some examples, the approach path may be determined over time as robotic apparatus moves along the path and as new sensor data becomes available.

In some examples, the approach path may be determined by the system by using an onboard navigation software module which runs a set of route planning algorithms and by using a pre-stored map of the data center. In other examples, the approach path may instead be determined by the remote control system and then sent to the onboard system of the robotic apparatus for execution.

In some examples, generating the path to approach the IT equipment rack involves determining a direction (or orientation) for the robotic apparatus while following the path to approach the IT equipment rack based on the location of the IT equipment rack, the current positioning of the robotic apparatus, or both. Specifically, the system can generate a path such that, upon arrival at the IT equipment rack, the robotic apparatus can properly place the one or more lifting elements under the IT equipment rack in order to lift the rack without further maneuvers, e.g., without rotation.

The system causes the robotic apparatus to move along the determined approach path toward the IT equipment rack (step 306). In particular, the system can output drive system control signals to servo motors which in turn drive the wheeled base to cause the robotic apparatus to navigate along the path toward the IT equipment rack for pickup. In some examples, to generate the drive system control signals, the system processes, e.g., extracts information for navigation from, the first image data captured by the first camera mounted on the first side surface of the main body of the robotic apparatus.

The system causes the lifting system of the robotic apparatus to pick up the IT equipment rack, including driving the one or more retractable wheels coupled to the one or more lifting elements to an extended position (step 308).

Figures 4A, 4B, 4C:
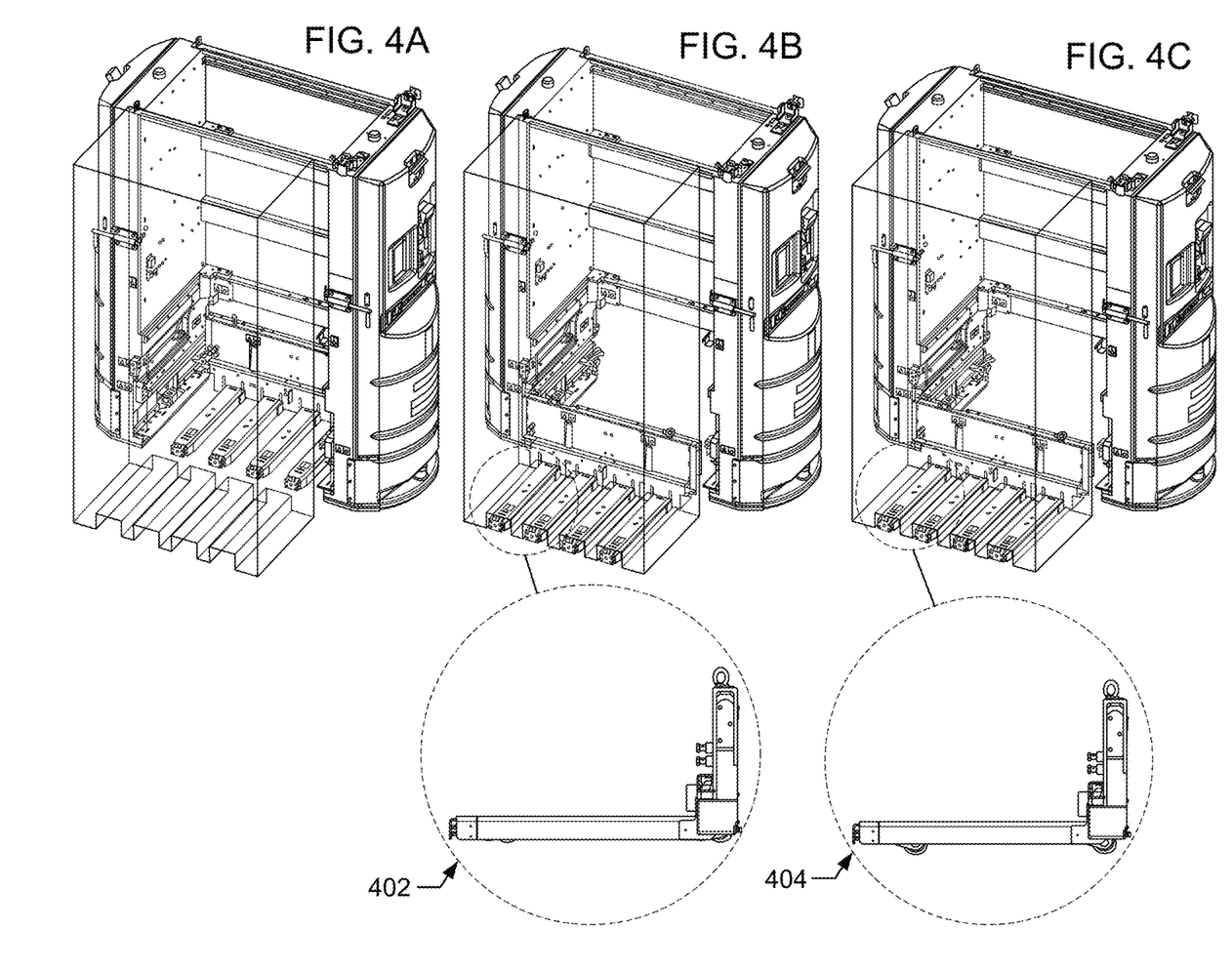
FIGS. 4A-E are illustrations of an example object handling process performed by a robotic apparatus.

FIGS. 4A-E are illustrations of an example object handling process performed by a robotic apparatus. As illustrated in FIGS. 4A-C, in some implementations, the system outputs lifting system control signals to the one or more drive actuators to drive the one or more lifting elements to extend substantially outside of the main body to place the lifting elements under the IT equipment rack. The system then outputs lifting system control signals to the one or more wheel actuators of the lifting system to drive the one or more retractable wheels coupled underneath to the one or more lifting elements to the extended position (as shown in the dashed circles 402 of FIG. 4B and 404 of FIG. 4C), thereby raising the one or more lifting elements relative to the first and second mounts attached to the main body of the robotic apparatus. In this way, the system lifts the IT equipment rack off the ground with the one or more lifting elements. The picked IT equipment rack may now be supported by the one or more retractable wheels, which in turn directly contact the ground surface.

In some of these implementations, other types of lift mechanisms, e.g., an elevator lift mechanism, may also be used by the robotic apparatus to provide additional lifting capability or force to lift the IT equipment rack. In some of these implementations, the system may drive the one or more retractable wheels to the extended (or partially extended) position prior to driving the one or more lifting elements to extend outside of the main body.

In some examples, the system can use sensor data to align and position the lifting system of the robotic apparatus for pickup, including ensuring that the one or more lifting elements are properly positioned under the IT equipment rack. In these examples, to generate the lifting system control signals, the system processes second image data captured by the second camera mounted on the front side of the main body and configured to capture second image data characterizing the environment in front of the front side of the main body. Other types of sensors, such as a force sensor that is configured to detect force, contact, and/or pressure from an external object, may be used as well or instead.

The system causes the lifting system of the robotic apparatus to move substantially inside the main body of the robotic apparatus, including driving the one or more retractable wheels coupled underneath to the one or more lifting elements to a retracted position (step 310).

Figure 4D:
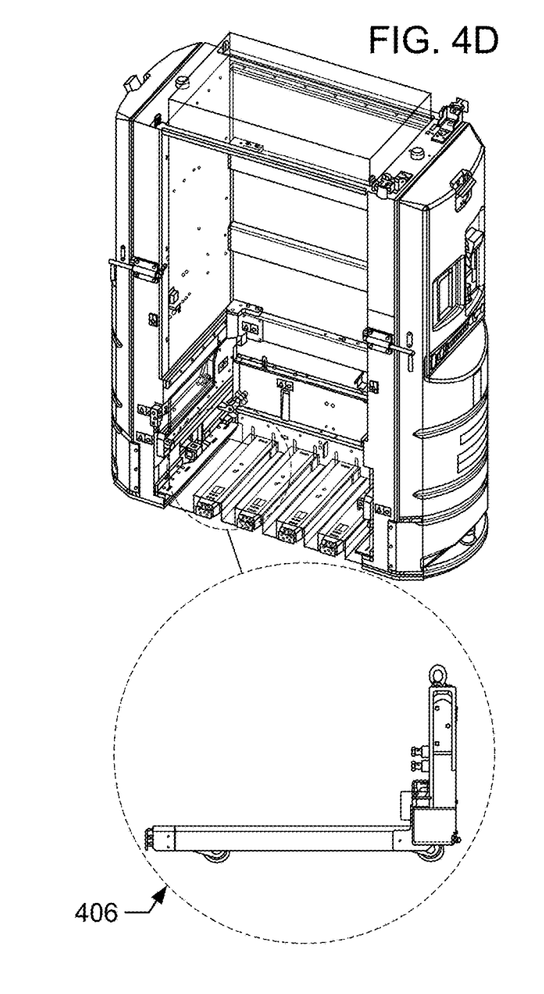
Figure 4E:
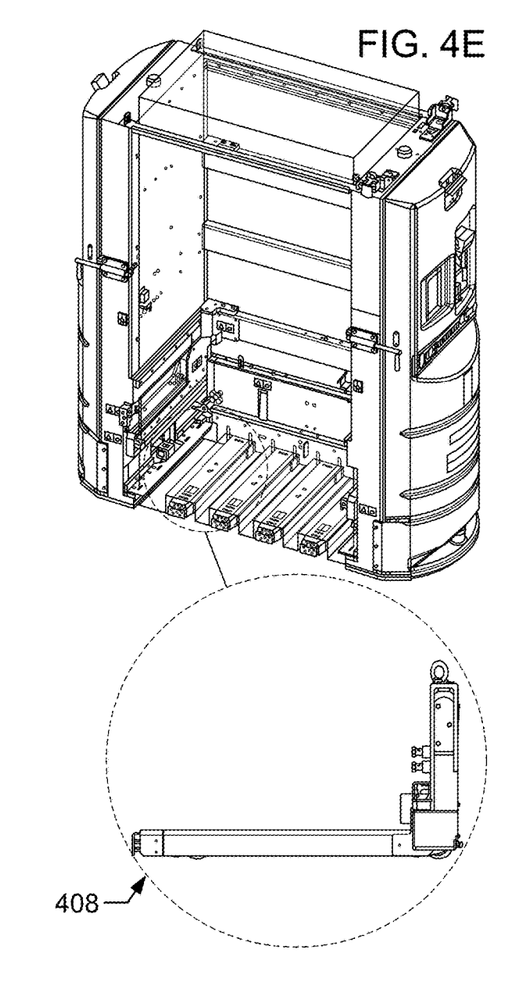

As illustrated in FIGS. 4D-4E, in some implementations, after lifting the IT equipment rack with the one or more lifting elements, the system outputs lifting system control signals to the one or more drive actuators of the lifting system to drive the one or more lifting elements to retract into the main body while the IT equipment rack is supported by the one or more retractable wheels (as shown in the dashed circle 406 of FIG. 4D), i.e., instead of on the first and second mounts of the main body. The system then outputs lifting system control signals to the one or more wheel actuators of the lifting system to drive the retractable wheels to the retracted position (as shown in the dashed circle 408 of FIG. 4E), effectively lowering the IT equipment rack, so that the IT equipment rack is positioned to rest on the first mount and second mount of the main body of the robotic apparatus.

Next, the system can cause the robotic apparatus to transport and concomitantly unload the picked IT equipment rack to a target drop off location. In some examples, the system may determine or receive information regarding the target drop off location for the IT equipment rack after it is picked up by the robotic apparatus. In some examples, the system can obtain, i.e., generate or receive, a delivery path and causes the robotic apparatus, which now carries the IT equipment rack supported by the first and second mounts of the body of the robotic apparatus, to follow the delivery path so as to deliver the IT equipment rack to the target drop off location, e.g., to a designated area of the data server. Once the robotic apparatus has arrived at the target drop off location, the system can cause the lifting system to unload the IT equipment rack, by similarly outputting lifting system control signals to the lifting system to cause the one or more retractable wheels to extend into the extended position so as to support the IT equipment rack while directly contacting the ground surface, and cause the lifting system to extend outside of the main body. The IT equipment rack may then be lowered onto the ground surface.

In some implementations, the robotic apparatus 100 has a human machine interface 190 operatively connected to the onboard control system 160. The human machine interface 190 can include a graphical display monitor and an input device, where the input device can for example be a touch screen (which may be included as part of the graphical display monitor), a control stick, a track ball, voice command, a keyboard, input buttons (including an emergency stop button), or any combination thereof. The human machine interface 190 allows a human operator to better command and control the robotic apparatus 100 to perform the IT equipment rack handling tasks. For example, the human machine interface 190 may display in real-time on the graphical display monitor the first and second image data captured by the onboard camera sensors. As another example, the human machine interface 190 may display information about any fault or error that has occurred during operation on the graphical display monitor. As yet another example, the human machine interface 190 may allow the human operator to manually enter IT equipment rack pick up information or other input commands through the input device, thus sending the robotic apparatus on its mission.

The components onboard the robotic apparatus 100 may be powered from one or more onboard batteries, which can be housed within the main body 110. The batteries may supply power to the robotic apparatus 100 during navigation and picking for a limited time, and may be rechargeable to maintain operation. Battery charging may occur separately from the robotic apparatus 100, or charging may occur opportunistically during times at which no electronic components swap is needed. In the former case, the batteries may be swapped with separately charged batteries for continued operation of the robotic apparatus 100. In the latter case, for opportunistic charging, the robotic apparatus 100 can have a charging element for interfacing an external charging station (e.g., a charging station that is located in a designated area of the data center) to receive electrical supply, i.e., to make temporary electrical contacts with the charging station which feed power into the onboard batteries.

In some implementations, the power sources that drive the wheel and drive actuators are located such that the depth of the robotic apparatus 100 is defined by a length of lifting elements, e.g., the length of the forks, and a back wall that is opposite the open front area. For example, power sources for the drive and wheel actuators may be located within the sides of the apparatus (rather than on the back wall), thereby narrowing the overall depth of the apparatus. Accordingly, the apparatus can be used in aisles that are not wide enough to accommodate conventional side load forklifts.

Figure 6A:
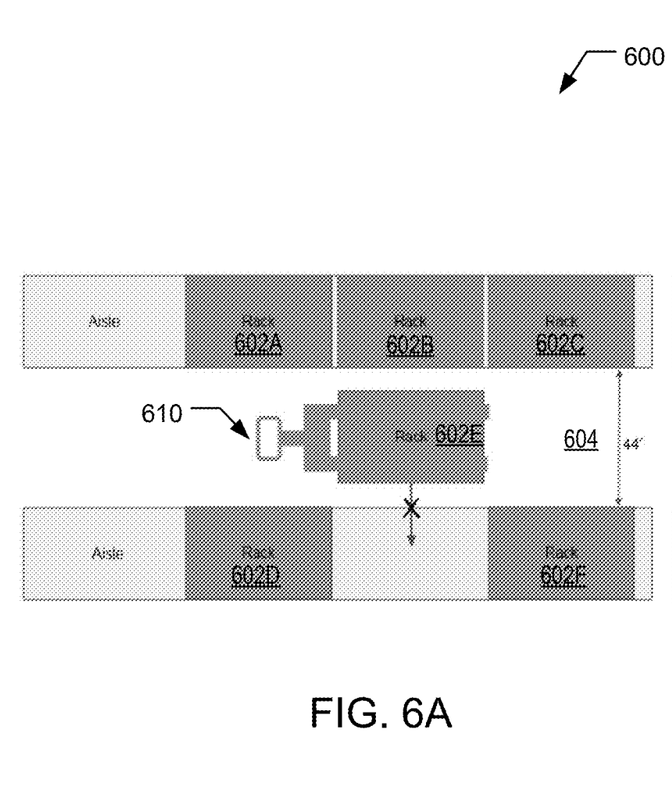
FIGS. 6A-B are illustrations of an example environment in which a robotic apparatus may be used.
Figure 6B:
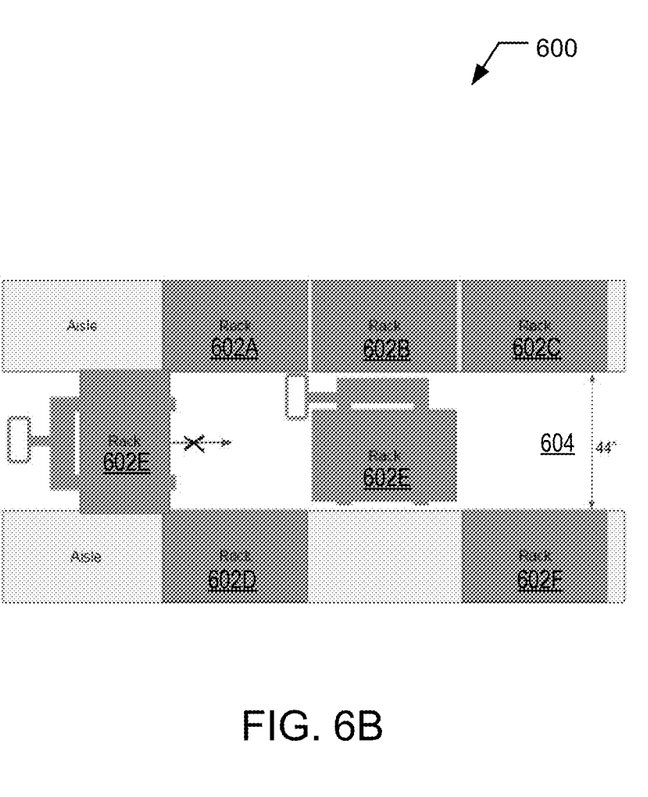

FIGS. 6A and 6B show an example environment in which a robotic apparatus, e.g., the robotic apparatus 100 of FIG. 1, operates from a top view.

Specifically, FIGS. 6A and 6B show an exemplary top view floor plan of a section of a data center 600 which includes two rows of IT equipment racks 602A-602C and 602D-602F and an aisle 604 separated by the two rows of the IT equipment racks along which the robotic apparatus 100 can travel. Each rack includes means for mounting, i.e., vertically stacking, IT equipment components such as hard drive disks therein.

In the example of FIGS. 6A and 6B, the open aisle is 44-48" wide, while each IT equipment rack may be as wide as 50". This space constraint present a unique challenge to rack movement, as it is physically impossible to rotate a rack in the aisle. Therefore, it is very hard to maneuver a rack while trying to move it with other conventional object handling apparatuses. For example, a standard pallet jack 610 may not be used in this example environment due to the orientation of the payload movement being orthogonal to the insertion direction. In addition, each IT equipment rack may weight up to 4500 lbs, or more. Thus, while a transroller pallet truck, which has the capability to move in orthogonal direction, may seemingly be applicable in this environment, the transroller lift mechanism of it could not be easily redesigned for this load capacity. Nor could it have custom fork shape that fits into the bottom configuration of common IT equipment racks.

On the contrary, the presently disclosed robotic apparatus 100 enables an IT equipment rack, e.g., IT equipment rack 602G, including all the IT equipment components stored therein to be handled in an automated manner, despite of all the aforementioned constraints and requirements. That is, the presently disclosed robotic apparatus 100 can automatically pick up, transport, and place a fully-stocked IT equipment rack within a data center, e.g., within the data center 600 as shown.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus, comprising:
    a body defining:
        a first side surface defining a first exterior side and a first interior side;
        a second side surface opposite to the first side surface and defining a second exterior side and a second interior side;
        an open front area on a front side of the body;
        a back side of the body opposite the front side of the body;
        a first mount on the first interior side; and
        a second mount on the second interior side and in a same horizontal position as the first mount;
    a drive system that propels and positions the apparatus along a horizontal surface; and a lifting system comprising one or more lifting elements with one or more retractable wheels coupled to each of the one or more lifting elements, wherein:
  a back wall of the lifting system is opposite the open front area;
  an overall depth of the apparatus is from the back side of the body to the front side of the body, the overall depth defined by a length of the one or more elements and the back wall of the lifting system;
  when the lifting system extends substantially outside of the body to perform an object handling operation for handling an object that is external to the apparatus, the retractable wheels are in an extended position and directly contact the horizontal surface, and the object rests on the one or more retractable wheels and is positioned to not rest on the first mount and second mount; and
  when the lifting system is substantially inside the body, the retractable wheels are in a retracted position, and the object rests on the first mount and the second mount of the body.

2. The apparatus of claim 1, wherein the lifting system further comprises one or more actuators that:
  drive the one or more lifting elements to extend outside of the body to place the one or more lifting elements under the object; and
  drive the one or more retractable wheels to the extended position to lift the object with the one or more lifting elements.

3. The apparatus of claim 2, wherein after lifting the object, the one or more actuators:
  drive the one or more lifting elements to retract into the body while resting on the one or more retractable wheels; and
  drive the retractable wheels to the retracted position so that the object rests on the first mount and second mount.

4. The apparatus of claim 1, further comprising a vision system including:
  a first camera mounted on the first side surface and configured to capture first image data characterizing an environment in front of the first side surface; and
  a second camera mounted on the front side of the body and configured to capture second image data characterizing an environment in front of the front side of the body.

5. The apparatus of claim 4, further comprising a control system that:
  generates, based on processing the first image data, drive system control signals to cause the drive system to drive the apparatus along a predetermined approach path toward the object; and
  generates, based on processing the second image data, actuator control signals to the one or more actuators to cause the actuators to drive the one or more retractable wheels and the one or more lifting elements to perform the object handling operation.

6. The apparatus of claim 5, wherein the control system is further configured to receive remote control signals from a remote control system.

7. The apparatus of claim 1, wherein the drive system comprises a set of drive wheels.

8. The apparatus of claim 7, wherein the drive wheels comprise wheels that operate with two degrees of freedom.

9. The apparatus of claim 1, wherein the one or more retractable wheels coupled to each of the one or more lifting elements comprise hydraulic lifting wheels that operate in one degree of freedom.

10. The apparatus of claim 1, wherein the object comprises one of: a cooling equipment rack, a power unit rack, or an IT equipment rack, comprising a hard disk drive (HDD) storage rack or a server rack.

11. A method comprising:
  receiving, by a control system of a robotic apparatus, instructions to pick up an object that is external to the robotic apparatus, wherein the robotic apparatus comprises;
    a body that has a first mount and a second mount attached to the body;
    an open front area on a front side of the body;
    a back side of the body opposite the front side of the body; and
    a lifting system comprising one or more lifting elements with one or more retractable wheels coupled to each of the one or more lifting elements, wherein a back wall of the lifting system is opposite the open front area; and
    an overall depth of the robotic apparatus is from the back side of the body to the front side of the body, the overall depth defined by a length of the one or more elements and the back wall of the lifting system;
  generating, by the control system of the robotic apparatus, a path to approach the object;
  causing, by the control system of the robotic apparatus, the robotic apparatus to move along the determined approach path toward the object;
  causing, by the control system of the robotic apparatus, the lifting system of the robotic apparatus to pick up the object, including driving the one or more retractable wheels coupled to the one or more lifting elements to an extended position to support the object; and
  in response to picking up the object, causing, by the control system of the robotic apparatus, the lifting system of the robotic apparatus to move substantially inside the body of the robotic apparatus, including driving the one or more retractable wheels coupled to the one or more lifting elements to a retracted position so that the object rests on the first and second mounts attached to the body.

12. The method of claim 11, wherein causing the lifting system of the robotic apparatus to pick up the object further comprises:
  causing the lifting system to extend outside of the body to place the one or more lifting elements under the object.

13. The method of claim 11, wherein causing the robotic apparatus to move along the determined approach path comprises generating drive system control signals to a wheeled base of the robotic apparatus.

14. The method of claim 11, wherein causing the lifting system of the robotic apparatus to pick up the object comprises generating lifting system control signals to one or more drive actuators and one or more wheel actuators of the lifting system.

15. The method of claim 14, further comprising:
  receiving, by the control system of the robotic apparatus, remote control signals from a remote control system; and
  generating, by the control system of the robotic apparatus, the lifting system control signals in accordance with the remote control signals.

16. The method of claim 14, further comprising:
receiving, by the control system of the robotic apparatus, input commands from a human operator through a human machine interface operatively connected to the control system.

17. The method of claim 11, wherein generating the path to approach the object comprises:
processing, by the control system of the robotic apparatus, image data generated by using a vision system of the robotic apparatus.

18. The method of claim 11, wherein the object comprises one of: a cooling equipment rack, a power unit rack, or an IT equipment rack, comprising a hard disk drive (HDD) storage rack or a server rack.

19. An apparatus, comprising:
a body defining:
a first side surface defining a first exterior side and a first interior side;
a second side surface opposite to the first side surface and defining a second exterior side and a second interior side;
an open front area on a front side of the body;
a back side of the body opposite the front side of the body;
a first mount on the first interior side; and
a second mount on the second interior side and in a same horizontal position as the first mount;
a drive system that propels and positions the apparatus along a horizontal surface; and
a lifting system comprising one or more lifting elements with one or more rollers coupled to each of the one or more lifting elements, wherein:
a back wall of the lifting system is opposite the open front area;
an overall depth of the apparatus is from the back side of the body to the front side of the body, the overall depth defined by a length of the one or more elements and the back wall of the lifting system;
when the lifting system extends substantially outside of the body to perform an object handling operation for handling an object that is external to the apparatus, the rollers directly contact the horizontal surface, and the object is positioned to not rest on the first mount and second mount; and
when the lifting system is substantially inside the body, the object rests on the first mount and the second mount of the body.

20. The apparatus of claim 19, wherein the rollers are wheels.

21. The apparatus of claim 19, wherein after lifting the object, the one or more actuators:
drive the one or more lifting elements to retract into the body while resting on the one or more rollers.

22. The apparatus of claim 19, further comprising a vision system including:
a first camera mounted on the first side surface and configured to capture first image data characterizing an environment in front of the first side surface; and
a second camera mounted on the front side of the body and configured to capture second image data characterizing an environment in front of the front side of the body.

23. The apparatus of claim 22, further comprising a control system that:
generates, based on processing the first image data, drive system control signals to cause the drive system to drive the apparatus along a predetermined approach path toward the object; and
generates, based on processing the second image data, actuator control signals to the one or more actuators to cause the actuators to drive the one or more retractable wheels and the one or more lifting elements to perform the object handling operation.

* * * * *